United States Patent [19]

McFaul et al.

[11] Patent Number: 5,012,504

[45] Date of Patent: Apr. 30, 1991

[54] AUTOMATIC BRIGHTNESS COMPENSATION FOR FLUOROGRAPHY SYSTEMS

[75] Inventors: James A. McFaul, Waukesha; David L. McDaniel, Dousman; Barry F. Belanger, Elm Grove, all of Wis.

[73] Assignee: General Electric Company, Milwaukee, Wis.

[21] Appl. No.: 456,447

[22] Filed: Dec. 26, 1989

[51] Int. Cl.$^5$ .................... H05G 1/44; H05G 1/34; H05G 1/32; H05G 1/64

[52] U.S. Cl. ............................. 378/108; 378/110; 378/112; 378/99

[58] Field of Search .............. 378/108, 110, 112, 99

[56] References Cited

U.S. PATENT DOCUMENTS

| | | | |
|---|---|---|---|
| 3,783,286 | 1/1974 | Kremer | 378/98 |
| 4,309,613 | 1/1982 | Brunn et al. | 378/97 |
| 4,454,606 | 6/1984 | Relihan | 378/97 |
| 4,573,183 | 2/1986 | Relihan | 378/108 |
| 4,590,603 | 5/1986 | Relihan et al. | 378/108 |
| 4,703,496 | 10/1987 | Meccariello et al. | 378/99 |
| 4,797,905 | 1/1989 | Ochmann et al. | 378/108 |
| 4,809,309 | 2/1989 | Beekmans | 378/99 |
| 4,935,946 | 6/1990 | Hefter et al. | 378/099 |

*Primary Examiner*—Edward P. Westin
*Assistant Examiner*—Don Wong
*Attorney, Agent, or Firm*—Quarles & Brady

[57] ABSTRACT

The brightness of an X-ray video image during fluorography is maintained at a substantially constant level by a control circuit which varies the X-ray dose in relation to changes in the average brightness of the X-ray image. Selected picture elements of the image which lie within a defined region in the image and which have a brightness above a given level are used to derive the average X-ray image brightness. The brightness of the selected picture elements are summed and the number of such picture elements counted. The summation of the brightness and the picture element count are both scaled by a factor of $2^n$ to reduce the size of the numbers of the complexity of the averaging circuitry. The scaled brightness summation is divided by the scaled picture element count and the result is stored as the average X-ray image brightness.

14 Claims, 3 Drawing Sheets

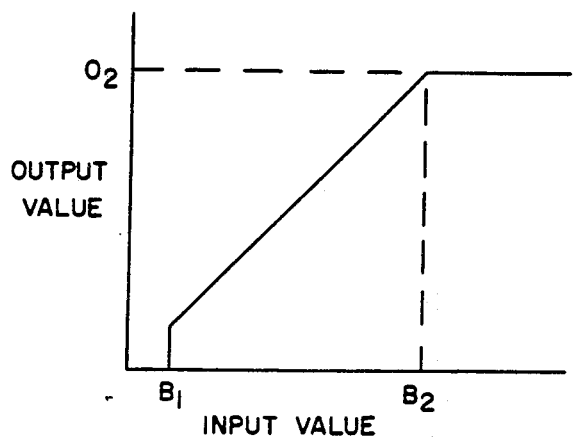
FIG. 3
FIG. 4
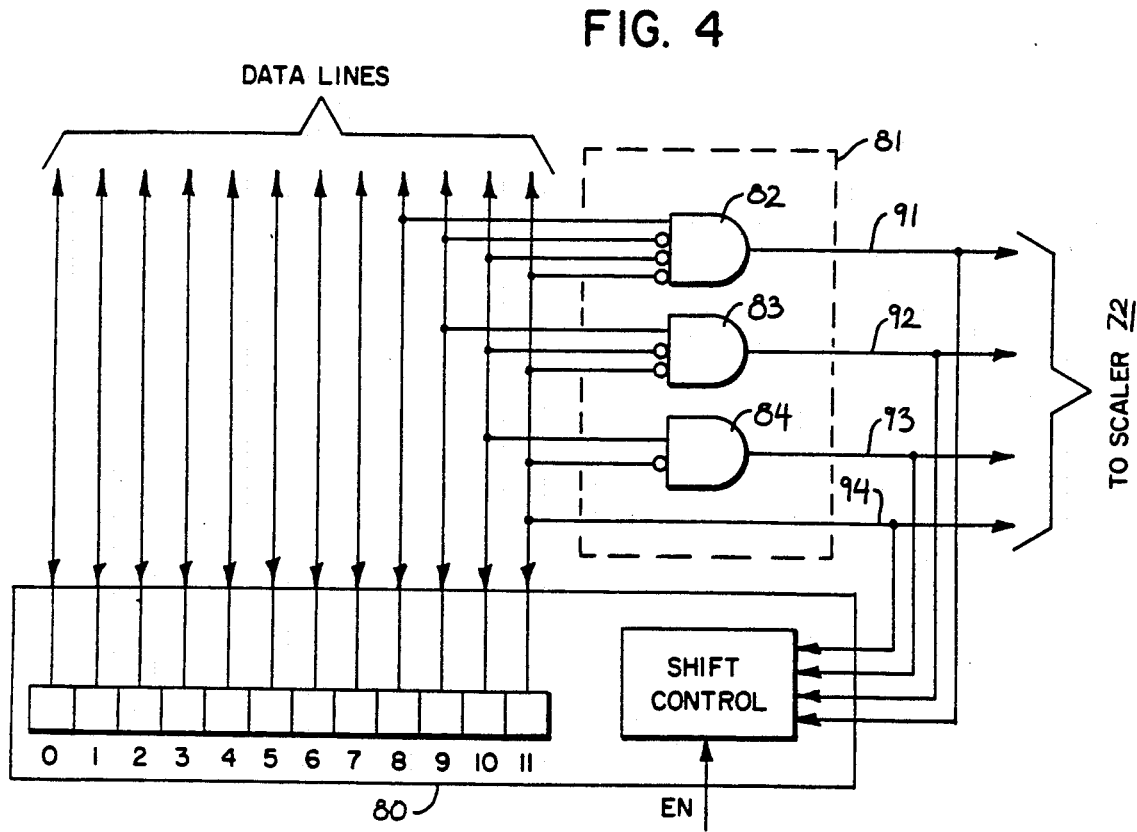

AUTOMATIC BRIGHTNESS COMPENSATION FOR FLUOROGRAPHY SYSTEMS

BACKGROUND OF THE INVENTION

The present invention pertains to X-ray fluorography apparatus, and in particular, to automatic brightness control systems for such apparatus.

During a fluoroscopic examination of a patient, an X-ray image is produced on the screen of a video monitor. To produce this image, the X-rays passing through the patient are picked up by an image intensifier tube, which produces a visible light image corresponding to the X-ray image. A video camera receives the visible light image from the intensifier tube and produces a video signal for the monitor, which displays the X-ray image.

As the X-ray beam scans different portions of the patient, the brightness of the video image will change due to variations in the attenuation of the X-ray beam as it passes through different thicknesses and densities of body tissue. In order to compensate for these variations in video brightness, different automatic compensation systems have been devised. One such system is described in U.S. Pat. No. 4,703,496 entitled "Automatic X-Ray Imager Brightness Control" and issued to the same assignee as the present invention. When this X-ray apparatus is operated in the fluorography mode, the luminance of the picture elements in each video image field is averaged to produce a signal representing the average brightness of the X-ray image. This average brightness signal then is used to control the excitation of the X-ray tube, thereby varying the X-ray dose to maintain the video image brightness substantially constant. Heretofore, such automatic brightness control systems were analog in nature in that the video signal section and the image brightness averager consisted of analog signal processing circuits.

With the advent of digital image storage devices and processing circuits to enhance digital video images, it is becoming advantageous to convert the analog signal from the video camera to a digital format for subsequent processing and display. Furthermore, by digitizing the video signal at an early stage in the signal processing, the effects of electrical noise on the signal are reduced. As a consequence, it is advantageous to digitize the X-ray video image signal as soon after the video camera as possible. However, since a high resolution two-dimensional X-ray image can comprise in excess of 4000 by 4000 picture elements (pixels), a conventional digital brightness averaging circuit must be able to process relatively large digital numbers in order to derive an average image brightness value. This results in a relatively complex digital circuit as compared to the analog equivalent.

During fluoroscopic examination of a patient, the physician may insert a lead gloved hand into the field of view to manipulate the patient. In other procedures, an X-ray opaque dye is injected into or ingested by the patient to enhance the contrast of selected anatomical features. Both the lead glove and dye produce extremely black portions of the X-ray image. These "artificially" blackened portions can be interpreted by an automatic brightness control as a darkening of the overall image, thereby misleading the control circuit into correctly adjusting the X-ray exposure. In this situation, the exposure would be misadjusted for imaging the anatomical features which are not covered by the glove or blackened by the dye.

In other situations, the patient may be positioned into only part of the X-ray beam allowing a portion of the beam to pass directly to the image intensifier tube without going through the patient. This portion of the beam is not attenuated significantly and creates a very bright section the resultant image. If the picture elements in the very bright image section are used in the averaging process, the brightness control circuitry may also misadjust the X-ray exposure for imaging the patient's anatomical features.

SUMMARY OF THE INVENTION

An X-ray diagnostic system includes a means for converting an X-ray image into a matrix of picture elements represented by an electrical signal comprising a sequence of digital numbers. Each of the digital numbers represents the relative brightness of a separate picture element in the X-ray image.

A control circuit is provided to maintain the brightness of the output X-ray image substantially constant. In order to perform its function, the control circuit calculates the average brightness of selected picture elements which are within a predefined area in the image and which have a brightness exceeding a given magnitude. Based on the calculated average brightness, the brightness control circuit regulates the X-ray tube excitation to vary the X-ray dose rate in order to minimize the variation in average brightness of the output video image.

The averaging is performed by a means for accumulating the digital numbers representing the brightness of the selected picture elements, a means for counting the number of selected picture elements and, optionally, may include a clipping or other transformation function which prevents highlights from overly affecting the average value. By dividing the accumulated digital value by the number of the picture elements selected, an average picture element brightness can be determined.

However, because a relatively large number of picture elements may be selected by the control circuit, the divider circuitry would normally have to handle relatively large digital numbers. In the preferred embodiment of the present invention, in order to reduce the complexity of the divider, the values in the accumulator and picture element counter are scaled by a fraction. This scaling reduces the size of the digital numbers being applied to the divider, and thereby simplifies the divider circuitry.

A general object of the present invention is to provide a digital circuit for computing the average brightness of a previously digitized X-ray image.

A more specific object is to provide such an averaging circuit that operates on the portion of the X-ray image which is likely to be of most interest to the observer. This is accomplished by processing only picture elements within a defined image area.

Another object is to weight less heavily in the averaging process picture elements within the defined image area which are close to the extremes of the brightness magnitude range.

Yet another objective of the present invention is to exclude averaging picture elements which may be artificially black due to an X-ray opaque object in the field of view. To achieve this objective only picture elements having a brightness level which exceeds a predetermined threshold are considered in the averaging process.

A further object is to provide an averaging circuit for an X-ray exposure control system which provides a prescaling of the accumulated picture element brightness in order to reduce the complexity of the arithmetic averaging circuit. The degree of prescaling can be a function of the number of picture elements selected for averaging.

BRIEF DESCRIPTION OF THE DRAWINGS

FIG. 3 graphically depicts the signal transformation performed by a look-up table memory in FIG. 2; and FIG. 4 is a conceptual representation of a barrel shifter and its control circuit for performing a numerical scaling operation.

DETAILED DESCRIPTION OF THE INVENTION

Figure 1:
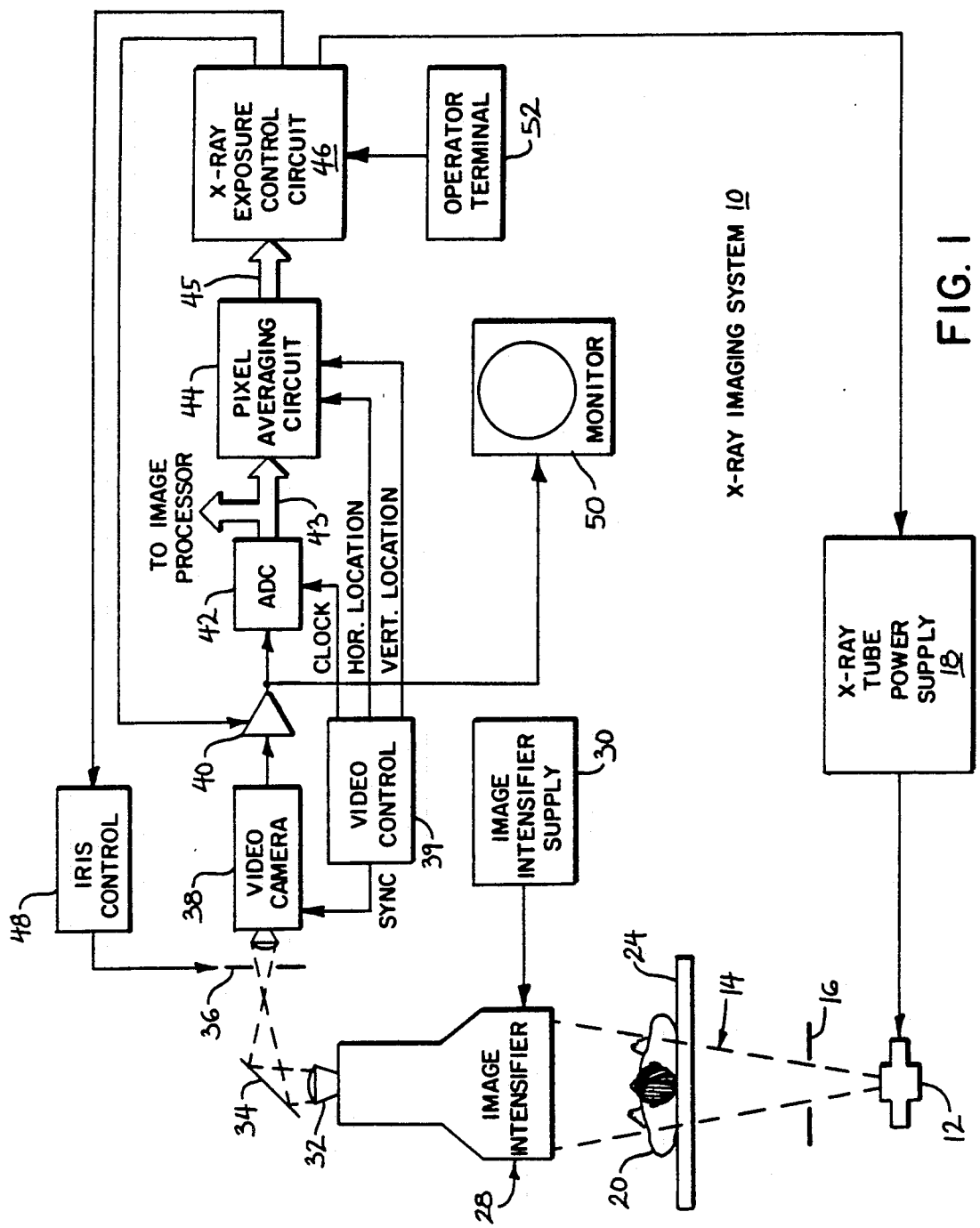
FIG. 1 is a block schematic diagram of an X-ray imaging system having an automatic image brightness control circuit which incorporates the present brightness averaging circuit.

With initial to reference to FIG. 1, an exemplary X-ray imaging system 10 which incorporates the present invention includes an X-ray tube 12 which emits an X-ray beam 14. The X-ray tube may be any of several conventional types such as one with a rotating anode and is excited by a conventional X-ray tube power supply 18. The X-ray beam 14 is formed by an aperture plate 16 and is directed toward a patient 20 lying on an X-ray transmissive table 24.

On the remote side of the patient 20 from the X-ray tube 12 is a radiation detection device which may comprise an image intensifier tube 28 energized by a power supply 30. In this example, the image intensifier tube 28 converts the X-ray radiation from the beam 14 into a visible light image which is projected by an output lens 32 and a mirror 34 through an aperture 36 into a video camera 38. The camera 38 utilizes conventional sync signals from a video control 39 to produce an analog video signal representing the two-dimensional X-ray image. Although the present invention is being described in the context of an X-ray system having an image intensifier and video camera, one skilled in the art will readily appreciate that the novel brightness compensation can be employed with other types of image detectors.

The analog video signal is amplified by a variable gain amplifier 40 and then applied to the input of a video monitor 50. The video monitor is part of an operator console which additionally includes a terminal 52 for the X-ray technician to control the operation of the X-ray imaging system 10.

The analog output of the variable gain video amplifier 40 also is coupled to an analog-to-digital converter 42 that is clocked by a signal from the video control 39. The converter 42 produces a digital representation of the image signal by generating a series of digital numbers representing the gray scale brightness (luminance) of picture elements in the X-ray image. For example, the image may be converted into a 4000 by 4000 picture element (pixel) digital image. Each picture element in this image can be identified by two numbers corresponding to the horizontal and vertical locations of the picture element in the image. The digitized version of the X-ray image produced by the analog-to-digital converter 42 is applied via a parallel data bus 43 to the input of a pixel averaging circuit 44 and to a conventional image processor (not illustrated).

The pixel averaging circuit 44 produces a digital output value which represents the average brightness of selected picture elements within the X-ray image, as will be described in detail. This average brightness output value is supplied by the averaging circuit 44 to an X-ray exposure control circuit 46 via parallel data lines 45. In other X-ray systems, a serial data link may be used in place of parallel lines 45. The X-ray exposure control circuit 46 is similar to that used in previous X-ray systems, such as the one described in U.S. Pat. No. 4,703,496. In response to the average image brightness level, the X-ray exposure control circuit 46 regulates various components of the X-ray imaging system 10 in a conventional manner to maintain the brightness level of the X-ray video image substantially constant. In doing so the X-ray exposure control circuit produces an output signal coupled to an iris control 48 that regulates the size of the aperture 36, a gain control signal for amplifier 40, and a series of control signals for the X-ray power supply 18 which regulate the different potentials and currents applied to the X-ray tube 12.

Figure 2:
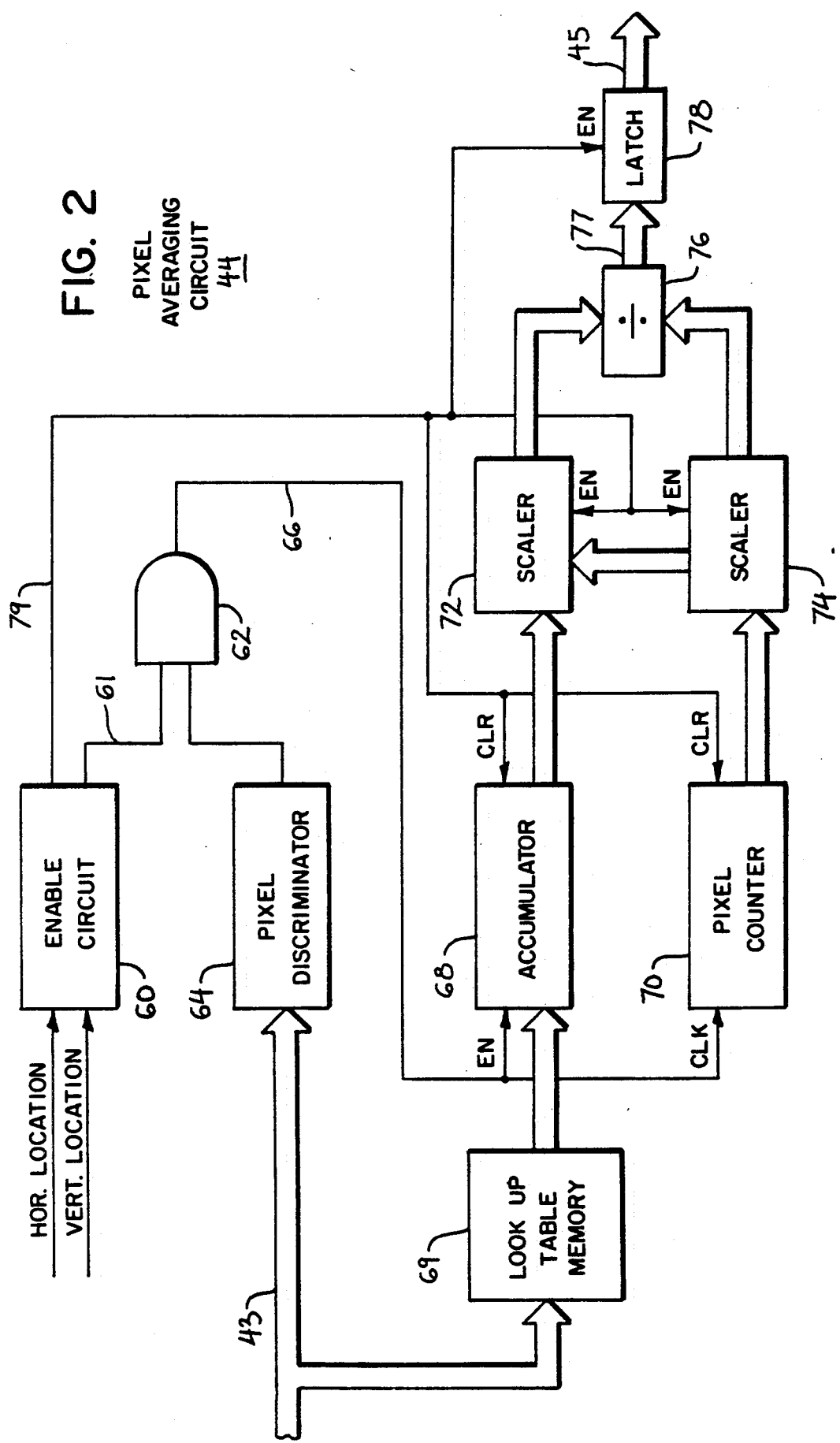
FIG. 2 is a block schematic diagram of the brightness averaging circuit.

The details of the pixel averaging circuit 44 are shown in FIG. 2. As noted previously, this component of the image processing system 10 averages the brightness of picture elements which conform to a given set of criteria. In order to be selected, a picture element must be within a predefined geometric area in the image and have a brightness level above a set threshold. For example, the predefined area is the central rectangular portion of the image surrounded by a narrow border. During fluorography, the X-ray apparatus typically is positioned so that the portion patient's anatomy of greatest interest to the medical personnel is centered in the X-ray image. By defining the picture element averaging area as the central portion of the X-ray image, it is likely that the image region of most interest to the X-ray system user will be employed by the pixel averaging circuit. As a consequence, the brightness of this region will be closely controlled. The concept of the present invention is not limited to a particular size, shape or location of this defined area in the X-ray image. As one alternative, the X-ray technician could define the entire X-ray image as the area for brightness averaging purposes.

The averaging circuit 44 includes an enable circuit 60, which determines whether a given picture element is within the area in which the picture elements are to be averaged. Stored within the enable circuit are two digital numbers representing locations of the left and right boundaries of the rectangular area in the image and two digital numbers representing locations of the upper and lower area boundaries. The enable circuit 60 receives from the video control circuit 39 two multi-bit digital numbers, one corresponding to the horizontal image location of the current picture element being fed from the analog to digital converter and the other number representing the vertical location of the current picture element. By comparing the horizontal location to the right and left image area boundaries and by comparing the vertical location to the upper and lower image area boundaries, the enable circuit 60 determines whether the current picture element lies within the defined brightness averaging area. When the current picture element lies within this area, the enable circuit 60 produces a brief high logic level pulse on output line 61 which is coupled to one input of an AND gate 62.

During a fluoroscopic examination, a physician wearing a leaded glove may place a hand into the X-ray exposure area to manipulate the patient. Prior to examination, the patient may ingest or be injected with an X-ray opaque dye to highlight certain anatomical features. Both of these procedures can produce a large number of black picture elements in the X-ray image's defined brightness averaging area. If these artificially blackened picture elements are included in the brightness averaging process, an inaccurate average brightness level may be derived for the portion of the X-ray image representing the patient's anatomy. In addition, as these artificially blackened picture elements can constitute a sizeable portion of the image, a relatively large area of interest should be defined to lessen the effect of a significant percentage of the picture elements in the area being blackened.

Therefore, another criterion for selecting a picture element for averaging is that it must exceed a given brightness threshold $B_1$ thereby excluding extremely dark picture elements. For example, the brightness threshold $B_1$ can be chosen to exclude picture elements with a brightness level in the lower ten percentile of the dynamic brightness range of the average anatomy. A pixel discriminator 64 is provided to determine whether a specific picture element is bright enough to be processed by the averaging circuit. The pixel discriminator receives the output of the analog to digital converter 42, representing the gray scale brightness of the current picture element as a multi-bit number. This multi-bit number is compared to the brightness threshold $B_1$ stored within the pixel discriminator 64 and if the value for the current picture element exceeds that threshold, a high logic level is applied to the other input of AND gate 62.

Although the image area boundaries and the brightness threshold $B_1$ can be permanently stored in the enable circuit 60 and the pixel discriminator 64, as an alternative these values may be programmable either by the X-ray technician or by service personnel. In this case, the enable circuit 60 and pixel discriminator 64 would be connected to a data bus over which these values are sent from the operator terminal 52 or other input device of the X-ray imaging system 10.

When the current picture element lies within the predefined image area and has a brightness above the selection threshold $B_1$, both inputs to the AND gate 62 will be high for the duration of the pulse from the enable circuit 60. This condition will produce a high logic level pulse on the output line 66 from the AND gate 62. This output line 66 is coupled to the clock input of a pixel counter 70 which counts the pulses applied to that input. Therefore, the pixel counter maintains a count of the number of picture elements which satisfy the selection criteria.

AND gate output line 66 also is coupled to the enable input of an accumulator 68, which adds the gray scale brightness level of the current picture element to the levels of previously selected picture elements. In this way, the accumulator produces a summation of the gray scale brightness levels for all of the picture elements which meet the selection criteria.

Although the output of the analog to digital converter on bus 43 may be applied directly to the inputs of the accumulator 68, in the preferred embodiment of the averaging circuit this output is coupled to the address inputs of a look-up table memory 69. The data output of the look-up table memory 69 is connected to the data input of the accumulator. This alternative coupling allows a transformation function to be applied to the brightness levels of the picture elements. The analog to digital converter's output addresses a location in the look-up table memory 69, at which is stored the resultant value of the transformation function.

With reference to FIG. 3, one such transformation function corresponds to the processing of an analog image signal by a diode clamping circuit to limit the maximum brightness level of the picture elements. If a portion of the X-ray beam 14 passes directly onto the image intensifier without going through the patient 20, as occurs when the patient lies to one side of table 24, the picture elements for a section of the resulting image will be extremely bright. These very bright picture elements are commonly referred to as image highlights. To protect against the highlights causing the control system to misadjust the X-ray exposure for imaging the patient's anatomy, the look-up table memory 69 performs a transformation function in which input picture elements having a brightness level of $B_2$ or greater will be clamped to a fixed output brightness level $O_2$. For example, the brightness level $B_2$ can be set to the maximum level of the dynamic brightness range for the average patient's anatomy. Picture elements having a brightness level between the threshold $B_1$ of the pixel discriminator 64 and level $B_2$ will have the same output brightness level (i.e. brightness in=brightness out). Since the pixel discriminator 64 disables the accumulator 68 for picture elements having a brightness level below $B_1$, the output of the look-up table is shown as zero since the output is ignored by the accumulator. The look-up table memory 69 can be employed to perform other transformations than the exemplary one depicted in FIG. 3.

Referring again to FIG. 2, the outputs of the accumulator 68 and the pixel counter 70 are applied to the inputs of two scaler circuits 72 and 74. Each of the scaler circuits divides its respective input number by $2^n$, where the scaling factor n is an integer. The scaling reduces the size of the numbers from the accumulator 68 and the pixel counter 70 to simplify a subsequent division circuit 76. The value of the scaling factor n may be fixed or variable and is chosen so that the precision of the averaging circuit, and correspondingly the automatic brightness control, will not be compromised. Although the scaling decreases the precision of the average brightness calculation, the precision obtained without any scaling is far in excess of that required for the satisfactory automatic brightness control. Therefore, this control will not be adversely affected by a moderate degree of scaling.

The enable circuit 60 also produces a brief high logic level control pulse on an output line 79 between each new X-ray image frame. The timing of this pulse is determined from the vertical location input to the enable circuit 60. On the rising edge of the pulse on line 79, the two scaler circuits 72 and 74 are enabled to process their respective inputs and apply the results to the division circuit 76. The division circuit divides the scaled summation of the picture element brightness levels from the accumulator by the scaled count of selected picture elements to produce an average brightness level on parallel data lines 77. These data lines 77 are applied to the input of a data latch 78, which stores the derived average brightness level. The falling edge of the control pulse on line 79 from the enable circuit 60 clears the accumulator 68 and the pixel counter 70 so that the picture elements from another X-ray image can be processed.

The scalers 72 and 74 employed by the brightness averaging circuit also ar novel devices. As the scaling is performed by dividing the input numbers to the scaler circuits by a power of two, the scaling operation may be performed by storing the input number in a shift register and shifting it a number of bit locations corresponding to the scaling factor n. Although the scaling factor may be fixed, it is preferred to derive the scaling factor n as a function of the picture element count magnitude, so that the result of scaling the picture element count is a digital number with a predetermined number of bits.

An exemplary circuit for performing the preferred embodiment of the scaling operation is shown in FIG. 4. A conventional barrel shifter 80 is conceptually illustrated as having twelve stages to store bits (or digits) of the multi-bit digital output from pixel counter 70. A barrel shifter is a type of shift register in which the number of stages that the stored number is shifted is determined by a multi-bit input to the device. A twelve-bit barrel shifter 80 has been shown for ease of illustration, whereas in practice the barrel shifter has twenty-four or more stages in order to count the maximum number of picture elements within the largest definable area of the image. Similarly, as will be described, the illustrated scaler is configured to produce an eight-bit scaled output; whereas other magnitude outputs could be produced to achieve other degrees of scaling and of accuracy for the derived average brightness.

As shown in FIG. 4, the data lines for the four most significant stages (stages 8–11) in the barrel shifter 80 are coupled to a scaling factor circuit 81. The scaling factor circuit 81 has three AND gates 82–84 and four output lines 91–94 and determines the number of stages to shift the contents of the barrel shifter 80. The data line for stage 11 of the barrel shifter 80 is coupled directly to output line 94 and to an inverting input of each of the three AND gates 82–84. The data line for stage 10 of the barrel shifter is coupled to a non-inverting input of AND gate 84 and to inverting inputs of AND gates 82 and 83. Stage 9's data line is coupled to a non-inverting input of AND gate 83 and to an inverting input of AND gate 82. Finally, the data line for barrel shifter stage 8 is coupled directly to a noninverting input of AND gate 82. The outputs of AND gates 82, 83 and 84 are applied directly to the output lines 91, 92 and 93, respectively.

A high logic level appearing on one of the output lines 91–94 indicates the number of stages that the contents of the barrel shifter should be shifted in order to produce an eight bit number. For example, a high logic level on output line 91 indicates a shift of one position, a high output on line 92 indicates a two position shift, whereas a high logic level on line 93 indicates three positions, and a high output on line 94 indicates a four position shift. The output lines 91–94 are coupled to the control input terminals to the barrel shifter 80 which determine the number of positions to shift the stored number. Since the scaling factor n used by both scaler circuits 72 and 74 must be the same, the output terminals 91–94 of the scaling factor circuit 81 are also applied to the control input terminals of the barrel shifter in scaling circuit 72 to shift the accumulator output by the same number of bit positions.

The scaler 74 is configured to scale the picture element count by a factor which produces an eight-bit resultant number. If the most significant bit (digit) of the picture element count which has a high logic level is in stage 11 of the barrel shifter 80, the count will be shifted left four stages. Following the shifting the most significant high logic level bit will be in stage 7 and the more significant stages will contain low logic levels. Similarly if stage 10 contains the most significant high logic level bit of the picture element count, the count will be shifted three stages, and so on for other magnitudes of the picture element count. If the most significant high logic level bit of the picture element count is in stages 0–7, a shift does not occur.

The details of the scaler 74 have been described for positive logic circuitry. However with appropriate modifications, the scaler and the present invention as a whole can be applied to negative logic signal processing systems.

We claim:

1. In an X-ray imaging system having a device that emits an X-ray beam, means responsive to the X-ray beam for producing a signal representing an image produced by the X-ray beam, and means for digitizing the signal into a series of discrete picture elements each of which having a brightness level; the improvement comprising a circuit for deriving an average brightness level including:

means for determining whether picture elements in the series are within a predefined region in the image;

a threshold detector which determines the relationship of picture element brightness levels to a predetermined value;

accumulator means, responsive to both said means for determining and said threshold detector, for producing a summation of the brightness levels of selected picture elements;

means for counting the number of selected picture elements, the brightness levels of which are summed by said accumulator means;

means for scaling the summation of selected picture element brightness levels and the selected picture element count by a common factor; and means for dividing the scaled summation of selected picture element brightness levels by the scaled selected picture element count to derive the average brightness level.

2. The circuit as recited in claim 1 further comprising means for transforming the brightness level of the selected picture elements according to a defined signal level transformation function and applying the transformed picture elements to said accumulator means.

3. The circuit as recited in claim 2 wherein said means for transforming converts the brightness levels of picture elements that exceed a given magnitude to a predefined brightness level.

4. The circuit as recited in claim 1 wherein said means for scaling divides the summation of selected picture elements brightness levels and the selected picture element count by $2^n$, where n is an integer.

5. The circuit as recited in claim 1 wherein said means for scaling includes:

a first digital shifter having a number of stages for storing digits of the summation of the brightness levels from said accumulator;

a second digital shifter having a plurality of ordinally numbered stages for storing digits of the count of the selected picture elements from said means for counting;

means for determining the number of the highest ordinally numbered stage of the second digital shifter which contains a given digit value;

means, operative when the determined number of the highest ordinally numbered stage of the second digital shifter which contains a given digit value is greater than a predefined number, for shifting the contents of said first and second digital shifters by a number of stages determined by the difference between the determined number and the predefined number.

6. The circuit as recited in claim 1 wherein said means for scaling includes:
a first shift register having a number of stages for storing digits of the summation of the brightness levels from said accumulator;
a shift register shifter having a plurality of ordinally numbered stages for storing digits of the count of the selected picture elements from said means for counting;
means for controlling said first and second shift registers to shift their stored digits by a given number of stages.

7. In an X-ray imaging system having device for emitting an X-ray beam, means for producing a signal representing an image produced by the X-ray beam, and means for digitizing the signal into a series of picture elements each having a brightness level; the improvement comprising a circuit for deriving an average brightness value including:
logic means for selecting picture elements in the series which are within a predefined region in the image and which have brightness levels that are above a predetermined value;
accumulator means, responsive to said logic means, for producing a summation of the brightness levels of the selected picture elements;
means for counting the number of selected picture elements;
means for reducing the magnitude of the summation and the magnitude of a count of selected picture elements by a common factor; and
means for dividing the reduced summation by the reduced count to derive the average brightness value.

8. The circuit as recited in claim 7 further comprising means for transforming the selected picture elements according to a defined signal level transformation function and applying the transformed picture elements to said accumulator means.

9. The circuit as recited in claim 7 wherein said logic means includes:
means for comparing the location of each selected picture element to boundaries of the predefined region; and
means for comparing the brightness of each selected picture element to the predetermined value.

10. The circuit as recited in claim 7 wherein said means for reducing includes:
a first shift register having a number of stages for storing digits of a numerical representation of the summation of the brightness levels;
a second shift register having a plurality of stages for storing digits of a numerical representation of the picture element count; and
means for controlling the first and second shift registers to shift the digits stored therein by a defined number of stages.

11. The circuit as recited in claim 10 wherein the defined number of stages is derived from the magnitude of the picture element count.

12. In an apparatus for processing an electrical signal representing an image composed of a series of picture elements, the improvement comprising a circuit for deriving an average brightness value including:
logic means for selecting picture elements in the series which are within a predefined region in the image and which have brightness levels that are above a predetermined value;
accumulator means, responsive to said logic means, for producing a summation of the brightness levels of the selected picture elements;
means for counting the number of selected picture elements;
means for reducing the magnitude of the summation and the magnitude of a count of selected picture elements by a common factor; and
means for dividing the reduced summation by the reduced count to derive the average brightness value.

13. The circuit as recited in claim 12 further comprising means for transforming the selected picture elements according to a defined signal level transformation function and applying the transformed picture elements to said accumulator means.

14. The circuit as recited in claim 12 wherein said means for reducing divides a numerical representation of the summation of selected picture element brightness levels and a numerical representation of the selected picture element count by a numerical value $2^n$, where n is an integer.

* * * * *